United States Patent [19]
Thiebaut

[11] 3,968,446
[45] July 6, 1976

[54] FREQUENCY AND PHASE CONTROL SYSTEM

[75] Inventor: Jean-Jacques Thiebaut, Paris, France

[73] Assignee: Thomson-CSF, Paris, France

[22] Filed: May 10, 1974

[21] Appl. No.: 468,996

[30] Foreign Application Priority Data
May 14, 1973 France............................ 73.17384

[52] U.S. Cl.............................. 328/134; 328/63; 178/69.5 TV
[51] Int. Cl.².................... 178 69.5 DC; H04B 1/02
[58] Field of Search............................ 328/63, 134; 178/69.5 TV, 69.5 DC

[56] References Cited
UNITED STATES PATENTS

| | | | |
|---|---|---|---|
| 3,435,141 | 3/1969 | Hileman et al.............. | 178/69.5 TV |
| 3,470,475 | 9/1969 | Peterson et al................ | 328/134 X |
| 3,493,680 | 2/1970 | Brown.......................... | 178/69.5 TV |
| 3,646,452 | 2/1972 | Horowitz et al..................... | 328/63 |
| 3,789,307 | 1/1974 | Clark.............................. | 328/63 X |

FOREIGN PATENTS OR APPLICATIONS

| | | | |
|---|---|---|---|
| 961,228 | 6/1964 | United Kingdom......... | 178/69.5 DC |

Primary Examiner—John Kominski
Attorney, Agent, or Firm—Cushman, Darby and Cushman

[57] ABSTRACT

The values of a binary frequency error signal are periodically transmitted to the generator to be controlled, through a narrow band channel. A sequence detector circuit records the successive received values of the frequency error signal and as a function of the last two received values, controls a modulated pulse generator circuit in order to form a variable-amplitude correction signal. The amplitude of the correction signal is reduced with each change in the value of the frequency error signal received, whose changes in value reproduce changes of a phase error signal.

2 Claims, 4 Drawing Figures

FREQUENCY AND PHASE CONTROL SYSTEM

The present invention relates to a system for controlling the frequency and phase of electrical signals, and intended in particular for use in a television network in order to ensure that different camera assemblies, located at a distance from a central station, operate in synchronism with the central station.

The known control systems to this end have the drawback that they require the transmission of quantified error signals, which cannot be transmitted in a narrow band channel, in order to obtain a correction signal of varying amplitude.

The present invention eliminates this drawback.

According to the invention, there is provided a frequency and phase control system for synchronizing a basic signal from a first oscillator with a reference signal delivered by a reference oscillator located in a central station, said first oscillator being located in a station remote from said central station, said control system comprising:

in said central station, means for receiving said basic signal, a phase and frequency error detecting circuit, fed by said received basic signal and said reference signal, for delivering a two-value digital phase difference signal representative of the sign of the phase difference between said reference signal and said basic signal, and a permanent two-value frequency difference signal representative of the sign of the frequency difference of said reference signal and said basic signal, the values of said frequency difference signal successively reproducing selected values of said digital phase difference signal, and a transmitting circuit for periodically transmitting, with a period of recurrence T, the values of said frequency difference signal to said remote station;

in said remote station, a receiving circuit for receiving each transmitted value of the frequency difference signal, and a correcting circuit, coupled to said receiving circuit, said correcting circuit including first means for temporaily storing each received value of the frequency difference signal, and second means for generating, for each received value of the frequency difference signal, a corresponding correction signal, the sign of which is determined by this received value, and the amplitude of which differs according to whether this received value differs or not from the preceding one.

The present invention will be better understood and others of its features rendered apparent, from a consideration of the ensuring description and related drawings in which.

Figure 1:
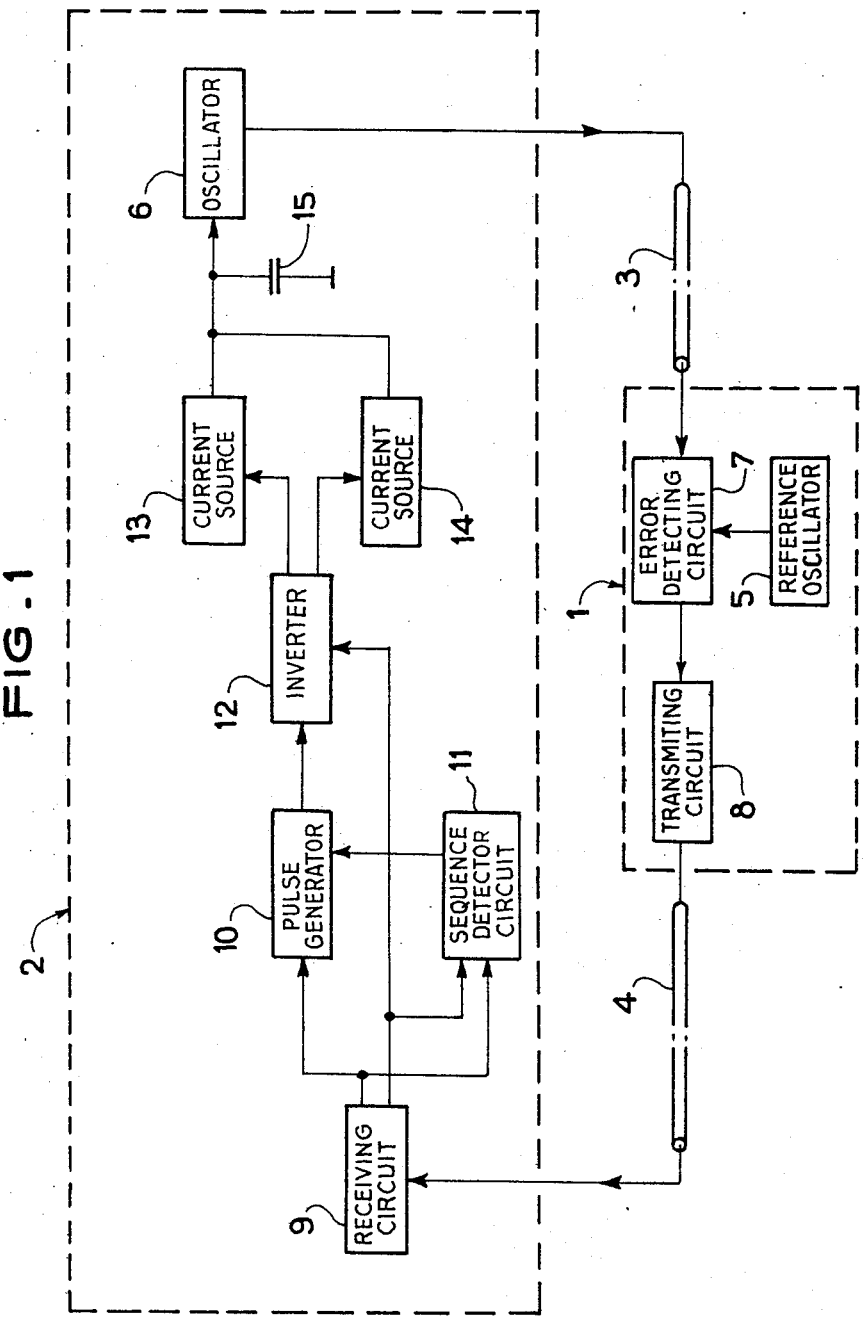
FIG. 1 is a block diagram of a frequency and phase control system in accordance with the invention.

In FIG. 1, a central station 1 and a remote station 2 are connected together through two transmission channels synbolized by the cables 3 and 4. The central station comprises a reference generator 5 operating at a frequency $f_o$, and the remote station a generator 6, the two generators being oscillators.

The object of the phase and frequency control system is to synchronize the signal received at the central station from the oscillator 6, through cable 3, with the signal delivered by the reference oscillator 5.

The central station further comprises an error detecting circuit 7, to the inputs of which there are applied the 5 reference signal, coming from the oscillator 5, and the signal from the generator 6, transmitted through the channel 3; and a transmitting circuit, 8, arranged between the output of the error detector 7 and the input of the transmission channel 4. The error detector, 7, delivers a binary frequency difference, or error signal, whose value 0 indicates that the frequency of the generator 6 is lower than that of the generator 5, and whose value 1 indicates the contrary case. The circuit 8 samples and periodically transmits the error signal, which, preferably, is encoded in an error detecting code. The transmission may be effected by phase-shift modulation of a carrier, phases O and $\pi$ respectively corresponding to the values 1 and 0.

The error detecting circuit 7 will be described by means of FIG. 4.

The frequency difference signal which it delivers, due to the way in which it is produced, makes it possible to obtain frequency and phase synchronization, with a high degree of accuracy, of two signals having initial different frequencies.

The remote station comprises a receiving circuit 9, coupled to the transmission channel 4; a correcting circuit which produces a voltage across the terminals of a capacitor 15, as a function of the samples of the demodulated and decoded frequency error signal which it receives from the circuit 9. The oscillator 6 has its output connected to the input of the transmission channel 3 and its control input connected to the output of the correcting circuit at one of the terminals of the capacitor 15.

The circuit 9 comprises, in addition to a demodulator followed by a decoder, all the conventional circuits of a binary data receiver. It delivers at a first output a clock singal at the frequency of the received signals, and at a second output, the demodulated and decoded signals. It also comprises elements which make it possible to interrupt transmission of the clock signal if decoding indicates that the error signal received has experienced disturbance during the course of transmission and has been falsified.

The oscillator 6 is a crystal-controlled oscillator operating at a frequency $f_o$, the relative frequency drift of which is less than $10^{-5}$; however, it comprises an auxiliary variable-capacitance diode which makes it possible to vary its frequency of oscillation within a limited range by means of a control voltage.

The correcting circuit is as follows: it comprises a modulated pulse generator 10 producing length-modulated pulses controlled by a sequence detector circuit, 11, two controlled current sources 13 and 14 coupled to the capacitor 15, and an inverter 12 arranged between the output of the generator 10 and the control inputs of the sources 13 and 14.

The controlled current source 13 is a positive current source which, when it receives a pulse at its control input, supplies a constant current $+I$ during the whole of the time T of said pulse; and no current during the remainder of the time; the controlled current source 14 is a negative current source which, similarly, supplies a constant current $-I$ during the time of the pulses applied to its control input, and no current during the remainder of the time. The capacitor 15 receives increments of positive or negative charges, $+IT$ or $-IT$, in accordance with which source is operating, and this is translated by positive or negative variations in the voltage across its terminals; each of the voltage increments across the terminals of the capacitor 15 constitutes the correcting signal corresponding to one of the received values of the error signal. The voltage across the terminals of the capacitor 15 is applied to the control input of the oscillator 6 through a very high impedance circuit so that the capacitor 15 does not discharge substantially through any circuit other than the current sources 13 and 14. The frequency of the oscillator circuit 6 varies around a centre frequncy in the same manner as the voltage across the terminals of the capacitor 15.

The inverter 12, at its control input, is supplied with the binary frequency error signal delivered by the circuit 9 and consequently transmits the pulses delivered by the pulse generator 10, to one or the other source.

The operation of this first arrangement is as follows: when the error is substantial, the binary frequency error signal retains the same value over several successive transmitted samples; the inverter 12 retains the same state so that only one of the sources is operative and charges up the capacitor 15 with successive pulses; the voltage across the terminals of the capacitor continues to vary in the same direction with successive increments and consequently the frequency of the oscillator 6 does likewise; this direction of variation is chosen so that it tends to reduce the detected frequency error. When the system is close to synchronism, the last increment in the correcting voltage produces a variation in the generator frequency such that the frequency error thereafter detected at the central station has the opposite sign to the preceding one and this brings about a modification in the corresponding error signal; this modification controls the switching of the inverter 12; the second current source then becomes operative and produces across the terminals of the capacitor 15 a voltage increment of the opposite sign to that of the preceding increment, bringing the system back to its preceding state. From this moment onwards, the frequency of the oscillator 6 is alternately higher and then lower than the reference frequency, the frequency error varying in the same fashion and the correcting voltage varying in alternate increments about a fixed mean value. All that is necessary is to make the frequency variation corresponding to an increment as small as possible in order to render the alternate variations in frequency and phase negligible and thus to achieve the desired quality of control. However, in the described embodiment, the correcting circuit is designed to improve the response time of the control system by modulating the amplitude of the voltage increments, that is to say the amplitude of the correcting signal, as a function of the sequence of correction going on. This is achieved by means of the pulse generater 10, with which there is associated the sequence detector circuit 11. The pulse generator 10, for each clock pulse, delivers a length-modulated pulse which, through the current sources and the capacitor 15, gives rise to a voltage increment, that is to say to a correction signal, which is amplitude-modulated.

Figure 2:
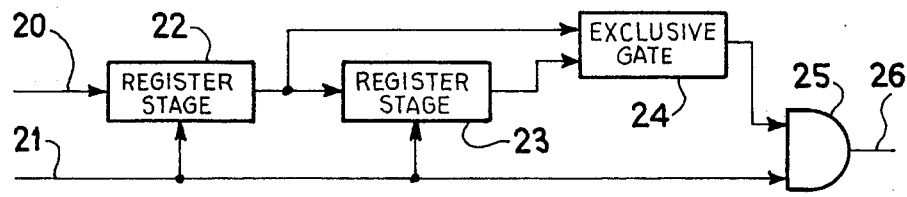
FIGS. 2 and 4 are diagrams of detailed embodiments of elements of the control system shown in FIG. 1.
Figure 3:
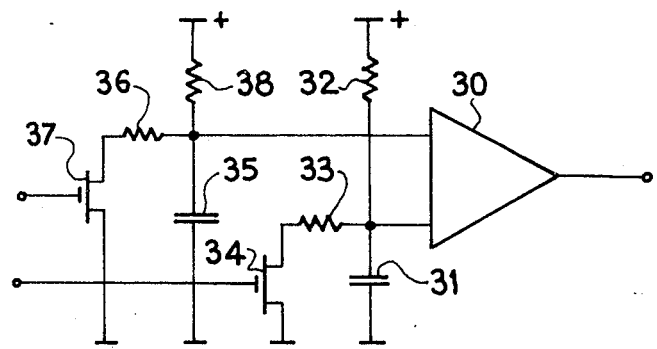

The circuits 11 and 10 are shown in more detailed fashion in the diagrams of FIGS. 2 and 3.

In FIG. 2, the sequence detector circuit has an input, 20, which receives the binary frequency error signal, and an input 21, which receives the clock signal from the circuit 9. It comprises: two shift-register stages 22, and 23, connected in cascade and coupled to the input 21 via their clock inputs, an "exclusive-OR" gate, 24, also called anticoincidence gate, connected by its two inputs to the outputs of the two stages 22 and 23, and an AND-gate 25 connected by its first input to the output of the gate 24 and by its second input to the input 21; the signal input of the first stage 22 forms the input 20 of the circuit; the output of the AND-gate 25 forms the output, 26, of the circuit.

At the time of reception of a clock pulse the first stage, 22, records the value of the error signal while the second stage records the preceding value which was recorded in the first stage. The sequence detection is performed by comparing those two values: if they are different, this means that the sign of the error signal has changed and that the error is small; it is then advisable to reduce the magnitude of the correction. This is done by transmitting a control pulse, through the gate 25, to the modulating circuit 10 in order to reduce the length of the modulated pulses.

The pulse generator circuit 10 is represented in FIG. 3; it primarily comprises a voltage comparator 30 whose first input is supplied with a voltage varying as a function of the sequence of the received values, and whose second input receives a voltage which rises as a function of time commencing from the instant of reception of a clock pulse; in a manner known per se, the comparator 30 changes state when one of the voltages becomes higher than the other. The output of this comparator of the output of the generator 10.

The second input of the comparator 30 is connected to the junction between a resistor 32 and a capacitor 31 connected in series between a positive voltage source and ground; a discharge circuit with a very short time constant, constituted by a resistor 33 and an electronic switch 34, is arranged across the terminals of the capacitor 31; the switch 34 receives the clock pulses at its control input.

The first input of the comparator 30 is connected to the junction between a resistor 38 and a capacitor 35 arranged in series between a positive voltage source and ground; a discharge circuit formed by a resistor 36 and an electronic switch 37 is arranged across the terminals of the capacitor 35; the switch 37 is supplied with the output signals from the output 26 of the circuit 11 (FIG. 2) at its control input. The time constant of the discharge circuit formed by resistor 36 and capacitor 35 is chosen to be in the order of magnitude of the duration of the control signals supplied by the circuit 11 so that the capacitor only partially discharges with each control pulse. The time constant of the discharge circuit formed by resistor 38 and capacitor 35 is very high.

The operation of this system is as follows: The capacitor 35 carries an initial voltage $U_o$ at its terminals; on reception of a clock pulse, the capacitor 31 discharges completely and the comparator 30 changes state; after the end of the clock pulse, the capacitor 31 is charged up across the resistor 32 and brings about a new change of state in the comparator 30 when the voltage across its terminals reaches the value $U_o$. The output signal from the comparator, between these two changes in state, is a length-modulated pulse. The duration of the pulse is a function of the voltage across the terminals of the capacitor 35 and is substantially proportional to its value $U_o$ so that the amplitude of the correction signal is substantially proportional to the voltage $U_o$ as well. By means of this circuit, it is an easy matter to obtain pulses whose duration can vary in a ratio of 100, and therefore a correcting signal whose amplitude varies in the same ratio.

Between two successive clock pulses, the capacitor 35 stores a voltage increment characteristic of the amplitude of the last correction signal produced. In the absence of any control pulses to the switch 37, the voltage $U_o$ does not vary substantially from one clock pulse to the next, and the successive correcting pulses have the same amplitude. By contrast, if the circuit 11 detects a change in sign in the error signal, it supplies a control pulse during the time of which the capacitor 35 discharges partially across the switch 37; the voltage across the terminals of the capacitor 35 is reduced to a fraction of the initial voltage $U_o$ (for example 0.5 $U_o$) and the amplitude of the corresponding correction signal is reduced in substantially the same ratio. If the control device is in a state close to synchronism and if the error signal is frequently changing sign, the amplitude of the correction signal is reduced with each change in sign and tends rapidly towards zero; this makes it possible, on the one hand, to achieve better stability and better accuracy than in systems where the amplitude of the correction signal is quantized, and, on the other hand, to more rapidly acquire the synchronous condition by initially employing correction signals of higher amplitude.

This latter property is due to the presence of the resistor 38. If no clock signal is supplied to the circuits 10 and 11, this, in particular, being the case during the period preceding the closing of the control loop, or if disturbances occur in the error signal transmission channel, the switches 34 and 37 remain open; the capacitor 31 remains charged and no modulating pulse is produced; the capacitor 35 charges slowly through the resistor 38. On closing of the control loop, the voltage across the terminals of the capacitor 35 is no longer zero but is close to the supply voltage if initial closing is involved, or is small if it is a closure following a disturbance which is involved. The charging time constant of the capacitor 35 through the resistor 38 is chosen so that the first correction signal applied to the oscillator following the momentary open-circuiting of the control loop, has a sufficient amplitude to compensate for the error occurring due to the inherent drift in the oscillator during this cut-off period.

The correcting circuit in forming a correction signal which is a function of the received error signal, of the preceding error signal and of the preceding correction signal, makes it possible to substantially reduce the quantity of information which has to be transmitted from the central station towards the remote station being controlled.

In a second embodiment of the control circuit, this fact is exploited in order to improve the level of protection against errors in the signal transmitted to the remote station and to still further reduce the response time of the control system. To this end, a second error signal is transmitted to the remote station in binary form. The two error signals transmitted are then respectively characteristic of the sign of the phase error and the sign of the frequency error, between the output signal from the oscillator 6 and the reference signal.

Figure 4:
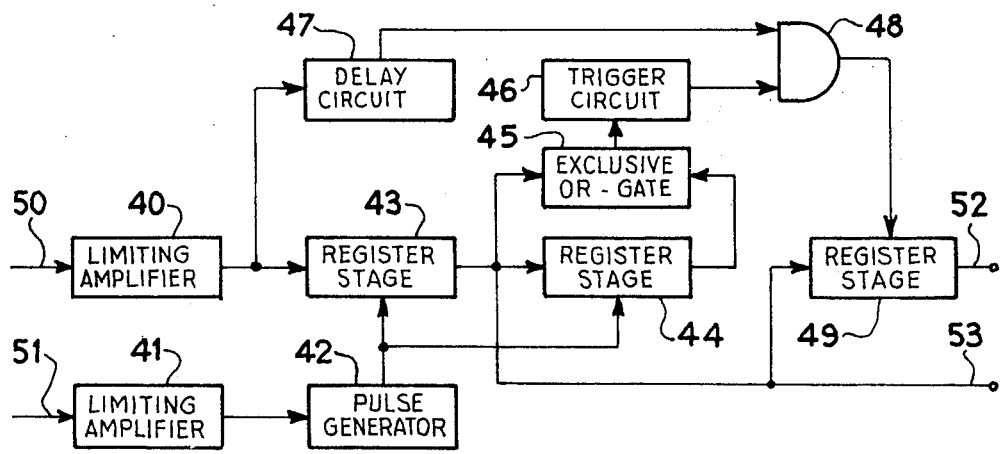

In the first and second embodiments, the error detecting circuit at the central station is of the kind shown in FIG. 4. It has two inputs 50 and 51 designed to respectively receive the reference signal produced at the central station, and the signal received from the oscillator 6. The first input 50 is connected to a limiting amplifier 40 which supplies a square wave signal whose 1 and 0 states respectively correspond to the alternations $|-\pi, 0|$ and $|0, \pi|$ of the reference signal. The input 51 is connected to a limiting amplifier 41 which operates in the same manner and whose output supplies a pulse generator 42; the pulse generator 42 supplies a short pulse in respect of the trailing edges of the output signal from the amplifier 41; these pulses are characteristic of the phase zero (modulo 2 $\pi$) in the signal received from the oscillator 6. These pulses are applied to the clock inputs of two shift-register stages 43 and 44 which are connected in cascade. The first stage 43 has its signal input connected to the output of the amplifier 40.

With each period of the oscillator signal and in respect of the zero phase in said signal, the first stage 43 receives a pulse and samples the squarewave signal received from the amplifier 40; it records a 1 or 0 state depending upon whether the reference signal lags or leads in phase in relation to the oscillator signal, during the period in question.

The recorded signal is a binary signal characteristic of the sign of the phase-shift between the two signals during a period of the oscillator signal. This signal is transmitted to an output 53 and forms the auxiliary error signal employed in the control system. The main error signal, or frequency difference signal, is obtained from the auxiliary error signal. The second stage 44 records the auxiliary error signal contained in the first stage, with a delay of one period; an exclusive OR-gate 45, connected to the outputs of the two stages 43 and 44, compares their contents and supplies a 1 condition at its output in respect of each change in sign of the auxiliary error signal; a monostable trigger circuit 46 supplies a short pulse for each leading edge in the output signal from the gate 45, that is to say for each change in sign on the part of the auxiliary error signal. The pulses from the trigger circuit 46 are applied to the first input of an AND-gate 48 which is supplied at its second input with the squarewave signal delivered by the amplifier 40 and delayed by a time equal to a quarter of the period of the reference signal, in a delay circuit 47. The gate 48 transmits the pulses from the trigger circuit 46 only if they occur for a phase of the reference signal comprised between $-\pi/2$ and $+\pi/2$. The pulses transmitted are applied to the clock input of a shift register stage 49 connected by its signal input to the output of stage 43. The signal recorded in the stage 49 is the main error signal and is transmitted to an output 52. This error signal is characteristic of the sign of the frequency difference between the two signals. Calculation shows that if the frequency received from the generator 6 remains comprised between $4f_o/5$ and $4f_o/3$ the main error signal is always characteristic of the sign of the frequency difference; the value 1 of this signal indicates that the signal from the oscillator 6 has a slightly higher frequency than the reference signal, its value 0 that it has a slightly lower frequency than the reference signal.

For each period of transmission, the two error signals are sampled and transmitted in the form of two successive bits, through the circuit 8 of the central station. On reception in the remote station, the two bits are separated by the circuit 9 for transmission to the sequence detector circuit through two separate channels. In this second embodiment, the correcting circuit of the remote station comprises a modified sequence detector circuit and pulse generator and the signal previously delivered by the output 26 of the circuit 11 of FIG. 2 is now obtained in the following way: the exclusive OR gate 24 is substituted by a decoder receiving at its four inputs, respectively, the $(n-1)^{th}$ frequency difference signal, the $n^{th}$ frequency difference signal derived from the same arrangement, 23-22, as the $(n-1)^{th}$ phase difference signal and the $n^{th}$ phase difference signal ($n = 2, 3, 4...$) derived from a similar arrangement, 123 and 122, receiving the same clock pulses and, at its input 120, the auxiliary error signal supplied by the output 53 of FIG. 4. The decoder 64 only decodes the combinations 0101 and 1010, indicating identical changes in value of the two difference signals, this affording a protection against an erroneous transmission resulting in an erroneous change in value of the frequency difference signal.

A second decoder 65, fed in the same way as the first one 64, decodes the combinations 0010, 0001, 1101 and 1110, i.e. those changes in the value of the phase difference signal which do not coincide with changes in the value of the frequency difference signal. The output signals from the first and second decoders as that from the first decoder, feeds an AND gate whose second input receives the pulses at the transmission frequency. The outputs of the two AND-gates respectively deliver main control pulses, playing the same part as the pulses from the output 26 of the circuit 11 of FIG. 2 played previously, and auxiliary control pulses.

While the first control pulses indicate that synchronism is close, the second ones point to the contrary conclusion. So, while the main control pulses are used for decreasing the charge of the capacitor 35 (FIG.3) determining the duration of the length-modulated pulses, the auxiliary control pulses may be used to increase the charge of the capacitor.

To this end, the pulse generator circuit of FIG. 3 may be modified in the following way: an electronic switch in series with a low resistance are arranged in parallel across the resistor 38, the control input of this switch receiving the auxiliary control pulses; when such a pulse, characteristic of a substantial frequency error, is applied to this switch, the capacitor 35 charges up to a value close to that of the supply voltage and the corresponding correction signal acquires the maximum amplitude; and this improves the speed with which the system is placed in the in-phase condition.

It will be observed that the cable 4 may be a telephone line.

When the remote and central stations are television stations, the cable 3 may be the same as that which is used to transmit to the central station the video signal generated in the remote station.

Of course, the invention is not limited to the embodiments described and shown which were given solely by way of example.

What is claimed is:

1. A frequency and phase control system for synchronizing a basic signal from a first oscillator with a reference signal delivered by a reference oscillator located in a central station, said first oscillator being located in a station remote from said central station, said control system comprising:

in said central station, means for receiving said basic signal, a phase and frequency error detecting circuit, fed by said received basic signal and said reference signal, for delivering a two valve digital phase difference signal representative of the sign of the phase difference between said reference signal and said basic signal, and a permanent two value frequency difference signal representative of the sign of the frequency difference of said reference signal and said basic signal, the values of said frequency difference signal successively reproducing selected values of said digital phase difference signal, and a transmitting circuit for periodically transmitting, with a period of recurrence T , the values of said frequency difference signal to said remote station;

in said remote station, a receiving circuit for receiving each transmitted value of the frequency difference signal, and a correcting circuit, coupled to said receiving circuit, said correcting circuit including first means for temporarily storing each received value of the frequency difference signal and second means for generating, for each received value of the frequency difference signal, a corresponding correction signal, the sign of which is determined by this received value, and the amplitude of which differs according to whether this received value differs or not from the preceding one.

2. A frequency and phase control system as claimed in claim 1 wherein said second means comprise : means for generating clock pulses at the transmission frequency 1/T of the values of said frequency difference signal; a pulse generator controlled by said clock pulses, including a first capacitor, for delivering for each clock pulse an output pulse whose duration is a function of the initial value of the voltage across said first capacitor; a second capacitor coupled to said first oscillator; and means for applying the output pulses from said pulse generator to said second capacitor, with one polarity or the other according to the last received value of said frequency difference signal; means coupled to said first means for delivering pulses respectively corresponding to the successive changes in the received values of the frequency difference signal; and switching means connected across said first capacitor and controlled by said last mentioned pulses, for decreasing said voltage.

\* \* \* \* \*